United States Patent

Gras

[11] Patent Number: 5,945,531
[45] Date of Patent: Aug. 31, 1999

[54] POLYISOCYANATES CONTAINING URETDIONE GROUPS

[75] Inventor: Rainer Gras, Bochum, Germany

[73] Assignee: Huels Aktiengesellschaft, Marl, Germany

[21] Appl. No.: 08/986,421

[22] Filed: Dec. 8, 1997

Related U.S. Application Data

[63] Continuation of application No. 08/600,030, Feb. 12, 1996, Pat. No. 5,750,727.

[30] Foreign Application Priority Data

Feb. 18, 1995 [DE] Germany .......................... 195 05 566

[51] Int. Cl.$^6$ .................................................. C07D 229/00
[52] U.S. Cl. .............................. 540/202; 528/45; 528/48; 528/49; 528/59; 528/67; 528/73; 528/80; 528/83; 528/85; 548/951; 548/952; 560/25; 560/26; 560/115; 560/158; 560/330; 252/182.2
[58] Field of Search .......................... 540/202; 548/951, 548/952; 560/25, 26, 115, 158, 330; 528/45, 48, 49, 59, 67, 73, 80, 83, 85; 252/182.2

[56] References Cited

U.S. PATENT DOCUMENTS

| | | | |
|---|---|---|---|
| 4,413,079 | 11/1983 | Disteldorf et al. | 524/169 |
| 4,463,154 | 7/1984 | Disteldorf et al. | 528/45 |
| 4,522,975 | 6/1985 | O'Connor et al. | 524/702 |
| 5,098,983 | 3/1992 | Mosbach et al. | 528/59 |
| 5,143,994 | 9/1992 | Laas et al. | 528/45 |
| 5,208,291 | 5/1993 | Wamprecht et al. | 525/124 |
| 5,216,107 | 6/1993 | Pedain et al. | 528/45 |
| 5,237,058 | 8/1993 | Laas et al. | 540/202 |
| 5,252,617 | 10/1993 | Werner et al. | 521/56 |
| 5,461,135 | 10/1995 | Malofsky et al. | 528/60 |
| 5,596,066 | 1/1997 | Laas et al. | 528/73 |

*Primary Examiner*—Rabon Sergent
*Attorney, Agent, or Firm*—Oblon, Spivak, McClelland, Maier & Neustadt, P.C.

[57] ABSTRACT

A polyisocyanate composition, comprising:

A) from 55 to 87% by weight of a polyisocyanate which contains uretdione groups;

B) from 10 to 30% by weight of blocking agent,

C) from 3 to 30% by weight of polyol having more than two hydroxyl groups and/or chain extender having more than two hydroxyl groups, wherein the polyisocyanate contains more than two terminal, partially or fully blocked isocyanate groups and has a molecular weight of from 1000 to 10,000.

10 Claims, No Drawings

POLYISOCYANATES CONTAINING URETDIONE GROUPS

This application is a Continuation of application Ser. No. 08/600,030, filed on Feb. 12, 1996, now U.S. Pat. No. 5,750,727.

BACKGROUND OF THE INVENTION

1. Field of the Invention

The present invention relates to polyisocyanates containing uretdione groups and having more than two terminal, partially or fully blocked isocyanate groups, to processes for their preparation and to their use in polyurethane coating systems.

2. Discussion of the Background

Polyisocyanates, which especially are used in polyurethane powder coatings, which contain uretdione groups, are known as described, in particular, in DE-A 30 30 554. Such polyisocyanates, however, have only two terminal, partially or fully blocked isocyanate groups and are strictly linear in structure. As disclosed in EP-A-254 154 (page 2, column 1, line 63 to end of sentence), this fact is of great disadvantage in practice. A need, therefore, continues to exist for a polyurethane which contains uretdione groups, which exhibits improved properties for use in powder coatings.

SUMMARY OF THE INVENTION

Accordingly, one object of the present invention is to provide polyisocyanates which contain uretdione groups which do not have the disadvantage in structure and the resulting consequences, of the known uretdione group-containing polyisocyanates.

Briefly, this object and other objects of the present invention as hereinafter will become more readily apparent can be attained by formulations based on polyisocyanates which contain uretdione groups and comprise A) from 55 to 87% by weight of polyisocyanate containing uretdione groups, B) from 10 to 30% by weight of blocking agent, and C) from 3 to 30% by weight of polyol having more than two hydroxyl groups and/or chain extender having more than two hydroxyl groups, the polyisocyanates containing more than two terminal, partially or fully blocked isocyanate groups and having molecular weights of from 1000 to 10,000.

DETAILED DESCRIPTION OF THE PREFERRED EMBODIMENTS

The present invention provides a process for the preparation of polyisocyanates containing uretdione groups, in which 1. the NCO groups of the polyisocyanate uretdione (component A) are reacted partially with the calculated quantity of blocking agent (component B), and 2. subsequently, in a second stage, the remaining NCO groups are reacted partially or completely with (component C).

The invention achieves the production of transparent or pigmented polyurethane coating systems, especially powder coatings, of high reactivity, and also provides transparent or pigmented polyurethane powder coating systems based on polyisocyanates containing uretdione groups, in combination with hydroxyl-containing polymers.

The uretdiones (component A) employed in the invention are obtained from diisocyanates by known methods, and in principle all known diisocyanates can be employed. Preferred uretdiones, however, originate from diisocyanates selected from the group consisting of hexamethylene diisocyanate (HDI), 2-methylpentane-1,5-diisocyanate (DI51), 2,2,4(2,4,4)-trimethylhexamethylene diisocyanate and isophorone diisocyanate (IPDI), which can be employed individually or in mixtures as component A. It is particularly preferred to use the uretdione of isophorone diisocyanate.

The isocyanurate-free uretdione of isophorone diisocyanate is highly viscous at room temperature, having a viscosity of more than $10^6$ mpa.s; at 60° C. the viscosity is $13 \times 10^3$ mPa.s and at 80° C. it is $1.4 \times 10^3$ mPa.s. The free NCO content is between 16.8 and 18.5% by weight, i.e., more or less high amounts of the polyuretdione of IPDI must be present in the reaction product. The monomer content is $\approx 1\%$. The total NCO content of the reaction product after heating at 180–200° C. is 37.5–37.8% by weight.

Suitable blocking agents (component B) include phenols, alcohols, acetoacetates, lactams, oximes, sterically hindered secondary amines and imidazolines. Particularly preferred blocking agents include caprolactam (CL), acetone oxime, methyl ethyl ketoxime (MEK-ox), cyclohexanone oxime, methyl isobutyl ketoxime, dicyclohexylamine (DCA) and phenylimidazoline.

Suitable polyols, as component C, include glycerol, trimethylolpropane (TMP), ditrimethylolpropane, trimethylolethane, 1,2,6-hexanetriol, 1,2,4-butanetriol, trishydroxyethyl isocyanurate (THEIC), pentaerythritol, mannitol or sorbitol, with trimethylolethane, trimethylolpropane and trishydroxyethyl isocyanurate. They are used individually or in mixtures.

The uretdione group-containing polyisocyanates contain, as a chain extender (component C) hydroxy-containing polyesters having a molecular weight of between 250 and 2,000, preferably from 300 to 1,500. They are prepared, for example, by reaction of polyols and dicarboxylic acids.

To prepare the chain extenders, the following polyols are preferably employed: glycerol, trimethylolpropane (TMP), ditrimethylolpropane, trimethylolethane, 1,2,6-hexanetriol, 1,2,4-butanetriol, trishydroxyethyl isocyanurate (THEIC), pentaerythritol, mannitol or sorbitol, as well as diethylene glycol, triethylene glycol, tetraethylene glycol, dipropylene glycol, polypropylene glycols, polybutylene glycols, xylylene glycol and neopentylglycol hydroxypivalate. Trimethylolethane, trimethylolpropane and trishydroxyethyl isocyanurate are preferably employed. They are used individually or in mixtures.

The preferred dicarboxylic acids for preparation of the chain extender include aliphatic acids with or without alkyl branching, such as succinic, adipic, suberic, azelaic and sebacic acid and 2,2,4(2,4,4)-trimethyladipic acid. Furthermore, lactones or hydroxycarboxylic acids can also be employed, with particular preference being given to ε-caprolactone and hydroxycaproic acid.

The polyols and chain extenders of component C can in each case be employed individually or in mixtures, with the mixing ratio being unimportant.

The polyisocyanates according to the invention, containing uretdione groups, can be prepared by the following process.

The synthesis occurs in two successive stages, wherein the features of the two stages are:

1. The NCO groups of the uretdione (component A) are reacted partially with the calculated quantity of blocking agent (component B).

2. Subsequently, in the second stage, the remaining NCO groups are reacted partially or completely with component C.

The reactions in both stage 1 and stage 2 can each be performed with or without solvent. If used, the solvent can be selected from the group consisting of aromatic and aliphatic hydrocarbons such as benzene, toluene, ethyl acetate, butyl acetate, acetone, methyl ethyl ketone, methyl isobutyl ketone and chlorinated aromatic and aliphatic hydrocarbons, as well as any desired mixtures of these or other inert solvents.

If the reaction is carried out without solvent, the reaction of stage 1 is performed batchwise or, preferably, continuously using a "static mixer". The reaction of stage 2 takes place in an intensive kneading apparatus, preferably using a twinscrew extruder. In addition, catalysts can be used to accelerate the reaction and if so are employed in a concentration of from 0.01 to 1% by weight, particularly preferably from 0.03 to 0.5% by weight. Preference is given to the use, as catalyst, of organotin compounds. Particular mention is made here of dibutyltin dilaurate (DBTL). Other catalysts, however, should not be regarded as being unsuitable in principle.

The uretdione group-containing polyisocyanates of the invention can be used in particular in polyurethane powder coating systems, which surprisingly exhibit increased reactivity. The polyurethane powder coating systems of the invention comprise the uretdione group-containing polyisocyanates of the invention in combination with hydroxyl-containing polymers.

Suitable co-reactants for PU powder coatings are compounds which carry functional groups which, during the curing process, react with isocyanate groups as a function of temperature and time. Examples of the compounds include those which contain hydroxyl, carboxyl, mercapto, amino, urethane and (thio)urea groups. Polymers which can be employed include addition polymers, condensation polymers and polyaddition compounds.

Preferred co-reactant components are primarily polyethers, polythioethers, polyacetals, polyester amides, epoxy resins having hydroxyl groups in the molecule, amino resins and their modification products with polyfunctional alcohols, polyazomethines, polyurethanes, polysulfonamides, melamine derivatives, cellulose esters and cellulose ethers, partially hydrolysed homo- and copolymers of vinyl esters, but especially polyesters and acrylic resins.

Preferred carboxylic acids for the preparation of polyesters include aliphatic, cycloaliphatic, aromatic and/or heterocyclic compounds in nature and may if desired be substituted by halogen atoms and/or may be unsaturated. Suitable examples of acid compounds include succinic, adipic (As), suberic, azelaic, sebacic, phthalic, terephthalic (Ts), isophthalic (Is), trimellitic, pyromellitic, tetrahydrophthalic, hexahydrophthalic, hexahydroterephthalic, di- and tetrachlorophthalic, endomethylenetetrahydrophthalic, glutaric, maleic and fumaric acids and, when available, their anhydrides, dimethyl terephthalate (DMT), bisglycol terephthalate, and also cyclic monocarboxylic acids such as benzoic acid, p-tert-butylbenzoic acid and hexahydrobenzoic acid.

Suitable examples of polyhydric alcohols for polyester preparation include ethylene glycol, 1,2-propylene glycol and 1,3-propylene glycol, 1,4-butylene glycol and 2,3-butylene glycol, di-β-hydroxyethylbutanediol, 1,6-hexanediol, 1,8-octanediol, neopentylglycol, cyclohexanediol, bis(1,4-hydroxymethyl)cyclohexane, 2,2-bis(4-hydroxycyclohexyl)propane, 2,2-bis[4-(β-hydroxyethoxy)phenyl]propane, 2-methyl-1,3-propanediol, 3-methyl-1,5-pentanediol, 2,2,4(2,4,4)-trimethyl-1,6-hexanediol, glycerol, trimethylolpropane, trimethylolethane, 1,2,6-hexanetriol, 1,2,4-butanetriol, tris(β-hydroxyethyl) isocyanurate, pentaerythritol, mannitol and sorbitol and also diethylene glycol, triethylene glycol, tetraethylene glycol, dipropylene glycol, polypropylene glycols, polybutylene glycols, xylylene glycol and neopentylglycol hydroxypivalate.

It is also possible to employ mono- and polyesters as lactones such as, for example, ε-caprolactone, and hydroxycarboxylic acids, for example, hydroxypivalic acid, ψ-hydroxydecanoic acid, ψ-hydroxycaproic acid, and thioglycolic acid. Polyesters of the above-mentioned polycarboxylic acids and/or their derivatives and polyphenols, such as hydroquinone, bisphenol A, 4,4'-dihydroxybiphenyl and bis(4-hydroxyphenyl) sulfone; polyesters of carbonic acid which are obtainable from hydroquinone, diphenylolpropane, p-xylylene glycol, ethylene glycol, butanediol or 1,6-hexanediol and other polyols by customary condensation reactions, for example with phosgene or with diethyl or diphenyl carbonate, or from cyclic carbonates such as glycol carbonate or vinylidene carbonate, by polymerization in a known manner; polyesters of silicic acid, polyesters of phosphoric acid, for example, of methane-, ethane-, β-chloroethane-, benzene- or styrene-phosphoric acid, -phosphoryl chloride or -phosphoric ester and polyalcohols or polyphenols of the above-mentioned type; polyesters of boric acid; polysiloxanes, for example, prepared by hydrolysis of dialkyldichlorosilanes with water and subsequent treatment with polyalcohols, and polysiloxanes prepared by addition of polysiloxane dihydrides with ethylenically unsaturated compounds such as allyl alcohol or acrylic acid.

Preferred polyesters also include, for example, the reaction products of polycarboxylic acids and glycidyl compounds, as described for example in DE-C 24 10 513.

The hydroxyl-containing polyesters which are employed with particular preference have an OH functionality of >2, an OH number of from 20 to 200 mg of KOH/g, preferably from 30 to 150 mg of KOH/g, a viscosity of <60,000 mpa.s, preferably <40,000 mPa.s, at 140° C. and a melting point of >70° C. to ≦120° C., preferably from 75° C. to 100° C.

Suitable examples of glycidyl compounds which can be used include (1) esters of 2,3-epoxy-1-propanol with monobasic acids having 4 to 18 carbon atoms such as glycidyl palmitate, glycidyl laurate and glycidyl stearate, (2) alkylene oxides having 4 to 18 carbon atoms such as butylene oxide, and (3) glycidyl ethers such as octyl glycidyl ether.

Dicarboxylic acids which can be used in this process are all of the polycarboxylic acids listed below under 2. Monocarboxylic acids which are listed below under 3, for example, can likewise be employed.

Preferred components also include monomeric esters, for example bis(hydroxy(alcohol) dicarboxylates, monocarboxylic esters of more-than-divalent polyols, and oligoesters which can be prepared by condensation reactions from the base materials which are customary in paint chemistry. Examples of compounds which can be regarded as such are:

1. Alcohols having 2 to 24 carbon atoms, preferably 2 to 10 carbon atoms, and 2 to 6 OH groups attached to nonaromatic carbon atoms, for example ethylene glycol, propylene glycol, diethylene glycol, dipropylene glycol, butanediols, neopentylglycol, hexanediols, hexanetriols, perhydrobisphenol, dimethylolcyclohexane, glycerol, trimethylolethane, trimethylolpropane, pentaerythritol, dipentaerythritol and mannitol.

2. Di- and polycarboxylic acids having 4 to 36 carbon atoms and 2 to 4 carboxyl groups and esterifiable derivatives thereof, such as anhydrides and esters, for example phthalic acid (phthalic anhydride), isophthalic acid, terephthalic acid, alkyltetrahydrophthalic acid, endomethylenetetrahydrophthalic anhydride, adipic acid, succinic acid, maleic acid, fumaric acid, dimeric fatty acids, trimellitic acid, pyromellitic acid and azelaic acid.

3. Monocarboxylic acids having 6 to 24 carbon atoms, for example caprylic acid, 2-ethylhexanoic acid, benzoic acid, p-tert-butylbenzoic acid, hexahydrobenzoic acid, monocarboxylic acid mixtures of natural oils and fats, such as coconut fatty acid, soya oil fatty acid, ricinenic fatty acid, hydrogenated and isomerized fatty acids, such as "Konjuvandol" fatty acid and mixtures thereof, it also being possible for the fatty acids to be employed as glycerides and to be reacted in transesterification and/or dehydration reactions.

4. Monohydric alcohols having 1 to 18 carbon atoms, for example methanol, ethanol, isopropanol, cyclohexanol, benzyl alcohol, isodecanol, nonanol, octanol and oleyl alcohol.

The polyesters can be prepared in a manner known per se by condensation in an inert gas atmosphere at temperatures of from 100 to 260° C., preferably from 130 to 220° C., in the melt or by an azeotropic procedure, as described for example in Methoden der Organischen Chemie [Methods of Organic Chemistry] (Houben-Weyl), vol. 14/2, 1–5, 21–23, 40–44, Georg Thieme Verlag, Stuttgart, 1963 or in C.R. Martens, Alkyd Resins, 51–59, Reinhold Plastics Appl. Series, Reinhold Publishing Comp., New York, 1961.

Preferred acrylate resins which can be used as OH components include homo- or copolymers, in which case, for example, the following monomers can be selected as starting compounds: (1) esters of acrylic acid and methacrylic acid with dihydric, saturated, aliphatic alcohols having 2 to 4 carbon atoms, for example 2-hydroxyethyl acrylate, 2-hydroxypropyl acrylate, 4-hydroxybutyl acrylate and the corresponding methacrylates; (2) acrylic and methacrylic alkyl esters having 1 to 18 carbon atoms in the alcohol component, such as methyl acrylate, ethyl acrylate, propyl acrylate, isopropyl acrylate, n-butyl acrylate, tert-butyl acrylate, 2-ethylhexyl acrylate, stearyl acrylate and the corresponding methacrylates; (3) cyclohexyl acrylate and cyclohexyl methacrylate; (4) acrylonitrile and methacrylonitrile, acrylamide and methacrylamide; and (5) N-methoxymethyl(meth)acrylamide.

Particularly preferred acrylate resins include copolymers of a. from 0 to 50% by weight of esters of acrylic or methacrylic acid with dihydric or higher polyhydric alcohols such as 1,4-butanediol monoacrylate, hydroxypropyl (meth)acrylate; and also vinylglycol, vinylthioethanol, allyl alcohol and 1,4-butanediol monovinyl ether;

b. from 5 to 95% by weight of esters of acrylic acid or methacrylic acid with monohydric alcohols containing 1 to 12 carbon atoms such as methyl methacrylate, ethyl acrylate, n-butyl acrylate and 2-ethylhexyl acrylate;

c. from 0 to 50% by weight of aromatic vinyl compounds such as styrene, methylstyrene and vinyltoluene;

d. from 0 to 20% by weight of other monomers containing functional groups, for example acrylic acid, methacrylic acid, crotonic acid, itaconic acid, maleic acid, fumaric acid, maleic anhydride, maleic monoester, acrylamide, methacrylamide, acrylonitrile or N-methylol(meth)acrylamide and glycidyl (meth)acrylate.

The amount of Group a. and/or Group b. in the acrylate resin is at least 5% by weight.

The acrylate resins can be prepared by such customary methods as solution, suspension, emulsion and precipitation polymerization. However, they are preferably prepared by bulk polymerization, which can be initiated by means of UV light.

Other suitable polymerization initiators include the usual peroxides and azo compounds, such as, for example, dibenzoyl peroxide, tert-butyl perbenzoate and azodiisobutyronitrile. The molecular weight of the acrylate resins can be regulated, for example, with sulfur compounds such as tert-dodecyl mercaptan.

Preferred polyethers can be prepared, for example, by polyaddition of epoxides such as ethylene oxide, propylene oxide, butylene oxide, trimethylene oxide, 3,3-bis (chloromethyl)oxacyclobutane, tetrahydrofuran, styrene oxide, the 2,5-bis(epoxypropyl) ether of diphenylolpropane or epichlorohydrin with itself, for example in the presence of $BF_3$, or by addition reaction of these epoxides, individually or mixed or in succession, with starting components containing reactive hydrogen atoms, such as alcohols or amines, examples being water, ethylene glycol, 1,3-propylene glycol or 1,2-propylene glycol, pentamethylene glycol, hexanediol, decamethylene glycol, trimethylolpropane, 4,4'-dihydroxydiphenylpropane, aniline, ammonia, ethanolamine, ethylenediamine, di($\beta$-hydroxypropyl) methylamine, di($\beta$-hydroxyethyl)aniline, hydrazine and also hydroxyalkylated phenols, for example di($\beta$-hydroxyethoxy)resorcinol.

It is likewise possible to employ hydroxyl-containing polyurethanes and/or polyureas.

As hydroxyl-containing polymers, it is of course also possible to employ mixtures of two or more substances.

The mixing ratio of the hydroxyl-containing polymers and the uretdione group-containing polyisocyanates is generally chosen such that there is 0.6–1.2, preferably 0.8–1.1 and, most preferably, 1.0 NCO group per OH group.

For the production of PU powder coatings, the isocyanate component is mixed with the appropriate hydroxyl-containing polymer and, if desired, catalysts and also pigments and customary auxiliaries such as fillers and levelling agents, e.g. silicone oil, acrylate resins, and the mixture is homogenized in a melt. This can take place in a suitable apparatus, for example, in heatable kneading equipment, but preferably by extrusion, in which case upper temperature limits of from 130 to 140° C. should not be exceeded. The extruded composition, after cooling to room temperature and after appropriate comminution, is around to a ready-to-spray powder. The application of the ready-to-spray powder to suitable substrates can be carried out by known methods, for example, by electrostatic powder spraying, fluidized-bed sintering, or electrostatic fluidized-bed sintering. After application of the powder, the coated workpieces are heated for curing purposes for from 60 to 4 minutes at a temperature of from 150 to 220° C., preferably from 30 to 6 minutes at from 160 to 200° C.

Having generally described this invention, a further understanding can be obtained by reference to certain specific examples which are provided herein for purposes of illustration only and are not intended to be limiting unless otherwise specified.

A Preparation of the Uretdione Group-containing Polyisocyanates of the invention A 1 Polyol Chain Extenders General preparation procedure The starting components, see Table 1, are placed in a reactor and heated in an oil bath to ≈140° C. After the substances have largely melted, 0.1% by weight of di-n-butyltin oxide is added as catalyst. Initial elimination of water takes place at from 150 to 160° C. The temperature is raised to from 180° C. to 190° C. over the course of from 2 to 3 hours and the esterification is brought to completion over a further 8 to 10 hours. During the entire reaction period, the bottom product is stirred and a weak stream of nitrogen is passed through the reaction mixture. The acid number of the polyester is always <2 mg of KOH/g.

TABLE 1

Polyol chain extender

| Example A1 | Starting components in mol | | | | OH number mg KOH/g | Viscosity at 25° C. mPa · s |
|---|---|---|---|---|---|---|
| | As | NPG | HD | TMP | | |
| 1 | 2 | 1 | 1 | 1 | 270–285 | 5,500 |
| 2 | Polycaprolactones Interox-Capa 304 | | | | 535–550 | 240 |
| 3 | Polycaprolactones Interox-Capa 305 | | | | 305–320 | 1,350 |
| 4 | Polycaprolactones Interox-Capa 316 | | | | 210–220 | 2,300 |

A 2 Polyisocyanates Containing Uretdione Groups

General preparation procedures

A 2.1 With solvent

The uretdione or a uretdione mixture, see Table 2, and the catalyst (from 0.03 to 1% by weight) are introduced into the reactor as a solution in the solvent. With vigorous stirring and under an inert gas atmosphere, the calculated quantity of blocking agent is added rapidly in portions at a rate such that the reaction temperature does not exceed 100° C. The reaction is monitored by titrimetric NCO determination; the reaction time of the first stage is from 2 to 5 hours. Subsequently, the calculated quantity of polyol and/or chain extender, see Table 2, is added to the partially blocked uretdione at a rate such that the reaction temperature does not exceed 100° C. After the end of addition of the OH component, stirring is continued until the NCO content has fallen to <1% by weight. Subsequently, the solvent is removed and the product is cooled and, if desired, comminuted.

A 2.2 Without Solvent

For the solvent-free preparation, the uretdione is likewise reacted in the first step with the calculated quantity of blocking agent, see Table 2. The required quantity of catalyst of from 0.1 to 1% by weight, based on end product is added during stage 1. After the end of the reaction, the partially blocked uretdione is fed at a temperature of from 80 to 150° C., together with the preheated (from 25 to 130° C.) polyol and/or chain extender, into a twin-screw extruder.

The extruder employed is composed of ten barrels, of which five are heating zones. The temperatures of the heating zones are within a wide range, between 50 and 180° C., and can be controlled individually. All temperatures are setpoint temperatures, and regulation in the barrels takes place by electric heating and pneumatic cooling. The die element is heated by an oil thermostat. The rotary speed of the twin screw fitted with conveying elements was between 50 and 380 rpm.

The reaction product, obtained in a quantity of from 10 to 130 kg/h, is either cooled, then comminuted or shaped and bagged, or else the melt is shaped, cooled and bagged.

The physical and chemical characteristics of the process products and the molar compositions are shown in Table 2.

The uretdiones, prepared by known processes, has, the following NCO characteristics:

IPDI uretdione

NCO-free: from 16.8 to 18.5% by weight total NCO: from 37.4 to 37.8% by weight

DI51 uretdione

NCO-free from 20.1 to 21.2% by weight total NCO: from 43.7 to 44.9% by weight

HDI uretdione (Desmodur® N 3400)

NCO-free: from 20.9 to 22.1% by weight total NCO: from 35.6 to 36.5% by weight

TABLE 2

Polyisocyanates containing uretdione groups

| | Composition in (mol) | | | | NCO content (% by weight) | | Chemical and physical characteristics | Glass transition tempera- |
|---|---|---|---|---|---|---|---|---|
| Example | Uretdione of | Blocking agent | Polyol | Chain extender | free | total | Melting range ° C. | ture |
| 1 | IPDI (3) | CL (3) | THEIC (1) | — | <0.1 | 19.5 | 130–132 | 77–95 |
| 2 | IPDI (6) | CL (9) | THEIC (1) | — | 0.1 | 22.2 | 110–117 | 45–67 |
| 3 | IPDI (3) | CL (3) | TMP (1) | — | 0.3 | 20.6 | 129–135 | 75–100 |
| 4 | IPDI (3) | CL (2.5) | TMP (1) | — | 0.8 | 21.9 | 131–134 | 99–105 |
| 5 | IPDI (3) | CL (2) | TMP (1) | — | 1.3 | 21.7 | 139–142 | 103–125 |
| 6 | IPDI (4) | CL (5) | TMP (1) | — | 0.4 | 21.6 | 113–116 | 63–85 |
| 7 | IPDI (6) | CL (9) | TMP (1) | — | 0.1 | 23.0 | 106–108 | 49–72 |
| 8 | IPDI (6) | CL (8) | TMP (1) | — | 0.6 | 22.8 | 105–109 | 51–66 |
| 9 | IPDI (3) | CL (3) | — | A1 (1) | <0.1 | 17.0 | 86–89 | 46–63 |
| 10 | IPDI (2.4) | CL (2.4) | — | A2 (1) | 0.2 | 19.5 | 94–97 | 48–57 |
| 11 | IPDI (3) | CL (3) | — | A3 (1) | <0.1 | 17.6 | 87–90 | 51–60 |
| 12 | IPDI (4) | CL (4) | — | A4 (1) | 0.2 | 15.8 | 74–77 | 23–45 |

TABLE 2-continued

Polyisocyanates containing uretdione groups

| | | Composition in (mol) | | | NCO content (% by weight) | | Melting range °C. | Glass transition temperature |
|---|---|---|---|---|---|---|---|---|
| Example | Uretdione of | Blocking agent | Polyol | Chain extender | free | total | | |
| 13 | IPDI (3) | CL (3) | TMP (0.75) | A3 (0.25) | 0.1 | 20.5 | 117–120 | 77–91 |
| 14 | IPDI (3) | CL (3) | TMP (0.5) | A3 (0.5) | 0.2 | 19.1 | 106–111 | 59–70 |
| 15 | IPDI (3.5) | CL (3.5) | TMP (0.5) | A4 (0.5) | 0.5 | 17.9 | 101–104 | 60–78 |
| 16 | IPDI (3.5) | CL (3.5) | A3 (0.5) | A4 (0.5) | 0.2 | 16.5 | 93–96 | 46–66 |
| 17 | DI51 (3) | CL (3) | THEIC (1) | — | 0 | 22.3 | 28–33 | (−2)–(+12) |
| 18 | DI51 (3) | CL (3) | TMP (1) | — | 0 | 23.6 | 25–30 | (−4)–(+10) |
| 19 | IPDI (2) DI51 (1) | CL (3) | TMP (1) | — | <0.1 | 22.2 | 96–99 | 45–66 |
| 20 | IPDI(1) DI51 (2) | CL (3) | TMP (1) | — | <0.1 | 22.9 | 70–74 | 41–58 |
| 21 | IPDI (2) N 3400 (1) | CL (3) | TMP (1) | — | <0.1 | 20.1 | 97–100 | 62–76 |
| 22 | IPDI (3) | MEK-ox (3) | TMP (1) | — | 0.2 | 22.3 | 99–102 | 56–72 |
| 23 | IPDI (3) | DCA (3) | TMP (1) | — | 0.1 | 19.3 | 126–128 | 97–111 |
| 24 | IPDI (3) | MEK-ox (3) | TMP (0.5) | A3 (0.5) | <0.1 | 19.9 | 75–81 | 42–58 |

B Polyester

Table 3 below gives an overview of the polyesters commercially available for the formulation of PU powder coatings.

Catalyst Masterbatch

A 5% by weight of the catalyst—DBTL—is homogenized in the melt in the corresponding polyester and comminuted after having solidified.

TABLE 3

Chemical and physical characteristics

| Example B | Producer Country | Designation | OH number mg of KOH/g | Acid number mg of KOH/g | Melting range °C. | Glass transition temperature °C. | Viscosity at 160°C. mPa · s |
|---|---|---|---|---|---|---|---|
| 1 | Hoechst AG Italy | Alftalat AN 739 | 55–60 | 2–4 | 82–90 | >50 | 24–29,000 |
| 2 | DSM Netherlands | Uralac P 1460 | 38–41 | 4–4.5 | 70–75 | 50 | 40,000 |
| 3 | UCB Belgium | Crylcoat 240 | 26–31 | 3–4 | 74–80 | >50 | 33–38,000 |

C Polyurethane Powder Coatings
General Preparation Procedure

The comminuted products, uretdione group-containing polyisocyanates (crosslinking agents), polyesters, levelling agent master batch and, if appropriate, catalyst masterbatch are intimately mixed with or without the white pigment in an edge runner mill and then homogenized in an extruder at a maximum temperature of 130° C. After cooling, the extrudate is fractionated and ground with a pinmill to a particle size <100 μm. The powder thus prepared is applied with an electrostatic powder spraying unit at 60 kV to degreased, optionally pretreated iron panels which are baked in a convection oven at temperatures between 160 and 200° C.

Levelling Agent Masterbatch

A 10% by weight amount of the levelling agent, which is a commercial copolymer of butyl acrylate and 2-ethylhexyl acrylate, is homogenized in the melt in the corresponding polyester and comminuted after having solidified.

The abbreviations in the tables below have the following meanings:

LT=layer thickness in μm

HK=König hardness (sac) (DIN 53 157)

HB=Buchholz hardness (DIN 53 153)

EI=Erichsen indentation (DIN 53 156)

CH=Crosshatch test (DIN 53 151)

GG 60° aspect=Gardner gloss (ASTM-D 5233) measurement

Imp. rev. Impact reverse in g.m

C 1 Transparent Powder Coatings

In accordance with the process described, the transparent powder coatings were prepared, applied and baked at between 160 and 200° C.

TABLE 4

Clearcoats

| Example C1 Formulation | 1 | 2 | 3 | 4 | 5 | 6 | 7 |
|---|---|---|---|---|---|---|---|
| Crosslinking agent according to A 2 | 18.72 | 17.9 | 12.69 | 9.83 | 17.22 | 20.33 | 19.04 |
| Table 2 (Example) | (1) | (3) | (3) | (3) | (6) | (11) | (13) |
| Polyester according to B 1 | 81.28 | 82.1 | — | — | 82.78 | 79.67 | 80.96 |
| Polyester according to B 2 | — | — | 87.31 | — | — | — | — |
| Polyester according to B 3 | — | — | — | 91.17 | — | — | — |
| Notes: | All formulations contained 0.5% by weight each of levelling agent and benzoin and 0.1% by weight of DBTL; the OH/NCO ratio = 1:1 | | | | | | |
| Coating data | | | | | | | |
| LT | 63–75 | 66–77 | 68–81 | 63–80 | 71–80 | 64–81 | 71–82 |
| HK | 207 | 209 | 213 | 199 | 203 | 201 | 198 |
| HB | 100 | 100 | 100 | 100 | 100 | 100 | 100 |
| CH | 0 | 0 | 0 | 0 | 0 | 0 | 0 |
| EI | >10 | >10 | >10 | >10 | >10 | >10 | >10 |
| Notes: | Curing conditions: 200° C./6–8 minutes, 180° C./12–15 minutes, 170° C./18–20 minutes | | | | | | |

TABLE 5

Pigmented Powder Coatings

| Example C 2 Formulation | 1 | 2 | 3 | 4 | 5*) | 6 | 7 | 8*) | 9 | 10 | 11 | 12 |
|---|---|---|---|---|---|---|---|---|---|---|---|---|
| Crosslinking agent according to A 2 | 18.72 | 9.62 | 16.83 | 17.9 | 14.85 | 12.69 | 9.83 | 8.02 | 17.22 | 9.42 | 8.97 | 20.33 |
| Table 2 (example) | (1) | (1) | (2) | (3) | (3) | (3) | (3) | (3) | (6) | (6) | (8) | (11) |
| Polyester according to B 1 | 81.28 | — | 83.17 | 82.1 | 85.15 | — | — | — | 82.78 | — | — | 79.67 |
| Polyester according to B 2 | — | — | — | — | — | 87.31 | — | — | — | — | — | — |
| Polyester according to B 3 | — | 90.38 | — | — | — | — | 90.17 | 91.98 | — | 90.58 | 91.03 | — |
| Notes: | All formulations contain 40% by weight of TiO$_2$ (white pigment) and 0.5% by weight each of levelling agent and benzoin, and also 0.15% by weight of DBTL; the OH/NCO ratio - 1:1;*) 1:0.8 | | | | | | | | | | | |
| Coating data | | | | | | | | | | | | |
| LT | 60–80 | 58–83 | 50–60 | 56–73 | 52–66 | 60–73 | 55–66 | 50–63 | 50–62 | 61–70 | 57–71 | 59–74 |
| HK | 189 | 189 | 181 | 180 | 183 | 185 | 181 | 172 | 182 | 173 | 175 | 171 |
| HB | 111 | 111 | 125 | 100 | 100 | 100 | 100 | 100 | 100 | 100 | 100 | 100 |
| CH | 0 | 0 | 0 | 0 | 0 | 0 | 0 | 0 | 0 | 0 | 0 | 0 |
| GG 60° aspect | 88 | 88 | 87 | 89–90 | 88 | 89 | 89–90 | 91–92 | 90 | 91–92 | 90 | 90 |
| SI | >10 | >10 | >10 | >10 | >10 | >10 | >10 | >10 | >10 | >10 | >10 | >10 |
| Imp. rev. | >944.6 | >944.6 | >944.6 | >944.6 | >944.6 | >944.6 | >944.6 | >944.6 | >944.6 | >944.6 | >944.6 | >944.6 |
| Notes: | Curing conditions: 200° C/8–10 minutes or 180° C./15–20 minutes | | | | | | | | | | | |

| Example C 2 Formulation | 13 | 14 | 15 | 16 | 17*) | 18 | 19*) | 20 | 21 | 22 | 23 | 24 |
|---|---|---|---|---|---|---|---|---|---|---|---|---|
| Crosslinking agent according to A 2 | 14.54 | 17.97 | 12.75 | 9.87 | 89.54 | 20.06 | 11.80 | 16.83 | 11.88 | 17.97 | 16.83 | 18.98 |
| Table 2 (example) | (11) | (13) | (13) | (13) | (13) | (15) | (15) | (19) | (19) | (21) | (22) | (23) |
| Polyester according to B 1 | — | 82.03 | — | — | — | 79.94 | — | 83.17 | — | 82.03 | 83.17 | 81.12 |
| Polyester according to B 2 | 85.86 | — | 87.25 | — | 10.46 | — | 88.20 | — | 88.12 | — | — | — |
| Polyester according to B 3 | — | — | — | 90.13 | — | — | — | — | — | — | — | — |
| Notes: | All formulations contain 40% by weight of TiO$_2$ (white pigment) and 0.5% by weight each of levelling agent and benzoin, and also 0.15% by weight of DBTL; the OH/NCO ratio - 1:1;*) 1:0.8 | | | | | | | | | | | |
| Coating data | | | | | | | | | | | | |
| LT | 65–71 | 57–65 | 63–70 | 59–75 | 64–81 | 71–84 | 65–78 | 64–71 | 73–87 | 65–83 | 50–60 | 55–65 |

TABLE 5-continued

| Pigmented Powder Coatings | | | | | | | | | | | | |
|---|---|---|---|---|---|---|---|---|---|---|---|---|
| HK | 173 | 181 | 183 | 179 | 177 | 174 | 177 | 175 | 176 | 172 | 171 | 187 |
| HB | 100 | 100 | 100 | 100 | 100 | 100 | 100 | 100 | 100 | 100 | 100 | 111 |
| CH | 0 | 0 | 0 | 0 | 0 | 0 | 0 | 0 | 0 | 0 | 0 | 0 |
| GG 60° aspect | 90 | 90 | 89–91 | 90–92 | 90 | 91–92 | 90 | 89–90 | 90 | 89–90 | 89 | 87 |
| EI | >10 | >10 | >10 | >10 | >10 | >10 | >10 | >10 | >10 | >10 | >10 | >10 |
| Tmp. rev. | >944.6 | >944.6 | >944.6 | >944.6 | >944.6 | >944.6 | >944.6 | >944.6 | >944.6 | >944.6 | >944.6 | >944.6 |
| Notes: | Curing conditions: 200° C./8–10 minutes or 180° C./15–20 minutes | | | | | | | | | | | |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A composition comprising a blocked polyisocyante product having a molecular weight of from 1000 to 10,000 and obtained by a process comprising: i) partially reacting from 55 to 87%, by weight of the product, of a uretdione containing isocyanate groups (component A) with from 10 to 30%, by weight of the product of blocking agent (component B) to block at least one but less than all the isocyanate groups of the uretdione; and ii) subsequently, reacting all or some of the remaining NCO groups, with from 3 to 30% by weight of the product of a polyol having more than two hydroxyl groups or a polyester or polycaprolactone chain extender having more than two hydroxyl groups component C).

2. The composition of claim 1, wherein said molecular weight ranges from 1500 to 5000.

3. The composition of claim 1, wherein said uretdione is derived from the diisocyanates: hexamethylene diisocyanate, 2-methylpentane-1,5-diisocyanate, 2,2,4(2,4,4)-trimethylhexamethylene diisocyanate and isophorone diisocyanate, which are employed individually or in mixtures.

4. The composition of claim 1, wherein said blocking agent is a phenol, an alcohol, an acetoacetate, a lactam, an oxime, or a sterically hindered secondary amine or imidazoline.

5. The composition of claim 1, wherein said blocking agent is caprolactam, acetone oxime, methyl ethyl ketoxime, cyclohexanone oxime, methyl isobutyl ketoxime, dicyclohexylamine or phenylimidazoline.

6. The composition of claim 1, wherein said polyol is trimethylolethane, trimethylolpropane, trishydroxyethyl isocyanurate, or mixtures thereof.

7. The composition of claim 1, wherein said chain extender is a polyester or polycaprolactone having a functionality of more than two, a molecular weight of between 230 and 2000 and a hydroxyl number of between 600 and 100.

8. The composition of claim 1, wherein said chain extender is a polyester or a polycaprolactone having a functionality of more than 2, a molecular weight of between 250 and 1000 and a hydroxyl number of between 550 and 250.

9. The composition of claim 7, wherein said chain extender is derived from at least one mol of polyol selected from the group consisting of trimethylolethane, trimethylolpropane, trishydroxyethyl isocyanurate and pentaerythritol.

10. The composition of claim 7, wherein said chain extender is derived from ε-caprolactone, hydroxycaproic acid or combinations thereof.

* * * * *